(12) United States Patent
Blanding

(10) Patent No.: US 8,386,391 B1
(45) Date of Patent: Feb. 26, 2013

(54) RESOURCE-TYPE WEIGHTING OF USE RIGHTS

(75) Inventor: William H. Blanding, Bow, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1480 days.

(21) Appl. No.: 11/742,656

(22) Filed: May 1, 2007

(51) Int. Cl.
*G06F 21/00* (2006.01)
*G06F 7/04* (2006.01)

(52) U.S. Cl. ............................................. 705/59; 726/4
(58) Field of Classification Search .................... 705/59, 705/7, 30; 709/224, 226, 202, 9; 713/320; 718/104, 105, 1; 707/206; 717/131; 726/4
See application file for complete search history.

(56) References Cited

U.S. PATENT DOCUMENTS

| | | | |
|---|---|---|---|
| 6,957,435 B2 * | 10/2005 | Armstrong et al. ........... | 718/104 |
| 6,988,134 B2 * | 1/2006 | Thorpe et al. ................. | 709/223 |
| 7,028,298 B1 * | 4/2006 | Foote ............................. | 718/104 |
| 7,089,306 B2 * | 8/2006 | Thorpe et al. ................. | 709/224 |
| 7,096,469 B1 * | 8/2006 | Kubala et al. ................. | 718/100 |
| 7,146,496 B2 * | 12/2006 | Circenis et al. ............... | 713/100 |
| 7,356,730 B2 * | 4/2008 | Ulrich et al. .................. | 714/6.12 |
| 7,373,497 B2 * | 5/2008 | Circenis et al. ............... | 713/100 |
| 7,454,502 B2 * | 11/2008 | Grimm et al. ................. | 709/226 |
| 7,596,784 B2 * | 9/2009 | Abrams et al. ................ | 717/172 |
| 7,720,968 B2 * | 5/2010 | Clarke et al. .................. | 709/226 |
| 2002/0124137 A1 * | 9/2002 | Ulrich et al. .................. | 711/113 |
| 2002/0138559 A1 * | 9/2002 | Ulrich et al. .................. | 709/203 |
| 2002/0156891 A1 * | 10/2002 | Ulrich et al. .................. | 709/225 |
| 2002/0166117 A1 * | 11/2002 | Abrams et al. ................ | 717/177 |
| 2004/0148394 A1 * | 7/2004 | Circenis et al. ............... | 709/226 |
| 2004/0148498 A1 * | 7/2004 | Circenis et al. ................... | 713/1 |
| 2004/0249763 A1 * | 12/2004 | Vardi ............................... | 705/59 |
| 2005/0138349 A1 * | 6/2005 | Hoffman et al. .............. | 713/150 |
| 2005/0149916 A1 * | 7/2005 | Shpeisman et al. ........... | 717/140 |
| 2005/0149940 A1 * | 7/2005 | Calinescu et al. ............. | 718/104 |
| 2007/0250838 A1 * | 10/2007 | Belady et al. ................. | 718/105 |
| 2009/0043877 A1 * | 2/2009 | Grimm et al. ................. | 709/223 |

OTHER PUBLICATIONS

Virtual Data Center. Using hardware resources to maximize virtualization performance. http://searchdatacenter.techtarget.com/guides/Using-hardware-resources-to-maximize-virtualization-performance.*
Resource Management Guide. VMware, Inc. Copyright 2006-2009. www.vmware.com/pdf/vi3_301_201_resource_mgmt.pdf.*
E. Canto et al.. A method for improving the functional density on dynamically reconfigurable logic by temporal bipartitioning. Technical University of Catalunya, Sidsa, Spain.*

* cited by examiner

*Primary Examiner* — James Kramer
*Assistant Examiner* — Nancy Loan Le

(57) ABSTRACT

Resource-type weighting is used in evaluating the use-rights associated with hardware resources.

11 Claims, 2 Drawing Sheets

RESOURCE-TYPE WEIGHTING OF USE RIGHTS

BACKGROUND OF THE INVENTION

Purchasers of computer systems who buy only enough hardware to meet current average demand often face costly interruptions when upgrading hardware to meet increased demands. In a 'limited-right-to-use" purchase model, a purchaser purchases a computer system with reserve computing power, but pays for only a subset of the installed hardware and software (e.g., an operating system) until the rest is required, e.g., by future increases in demand. Refinements of this business model 1) allow a user to make temporary use of the reserve capacity to handle spikes in demand, 2) allow use rights to migrate among resources to facilitate a reallocation of resources to workloads. Intra-server and inter-server migration of use rights are addressed in copending patent application Ser. Nos. 11/590,334 and 11/590,584.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

Figure 1:
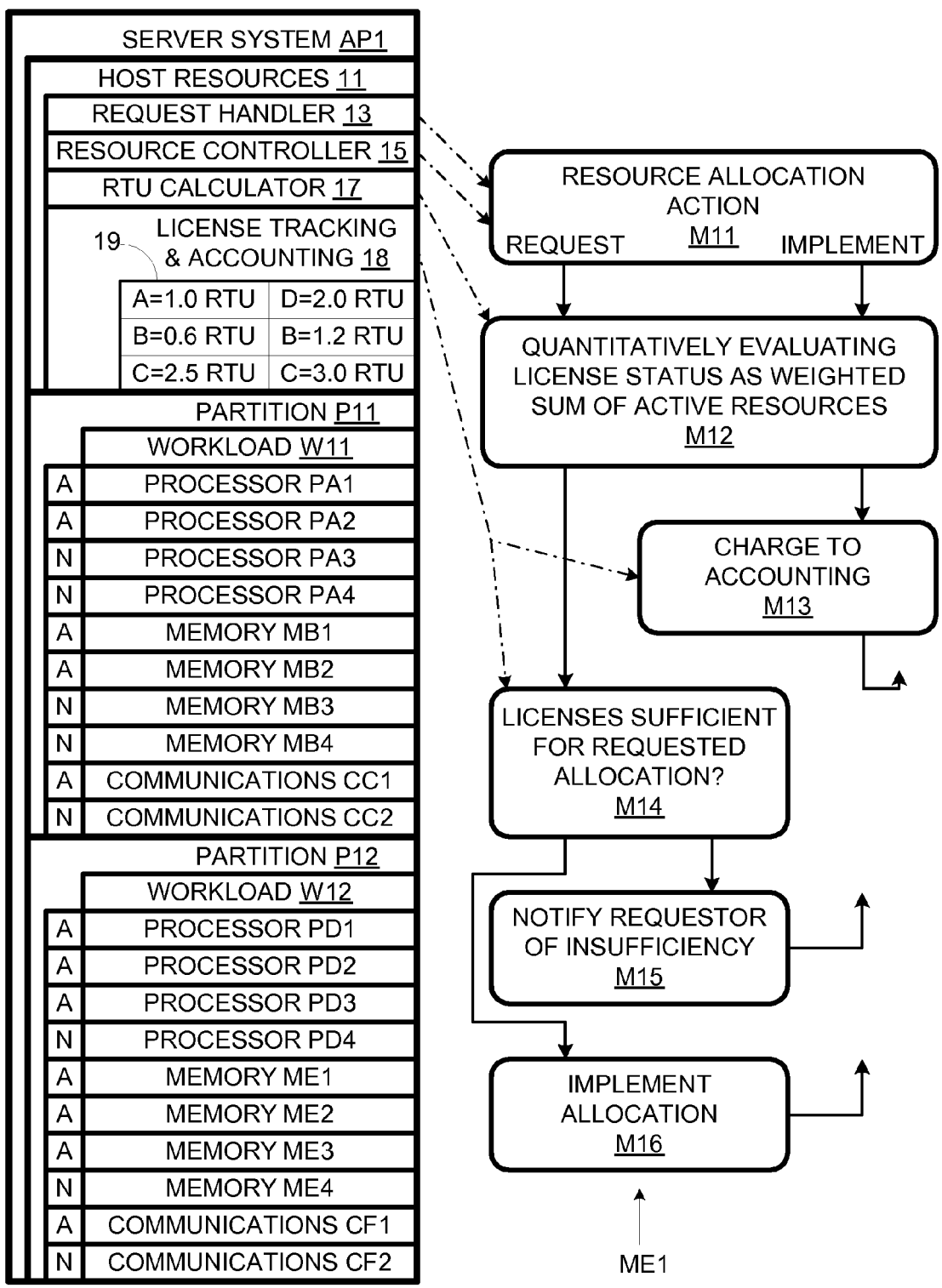
FIG. 1 is a combination schematic diagram and flow chart in accordance with embodiments of the invention.

A server system AP1 comprises host resources HR1, and partitions P11 and P12 for running user workloads W11 and W12, as shown in FIG. 1. While server system AP1 is a single housing with two or more partitions, the invention applies to systems with partitions distributed among separate standalone servers. While the illustrated partitions have particular hardware resources, the invention applies quite generally to diverse sets of hardware resources.

Partition P11 includes processors PA1-PA4, memory modules MB1-MB4, and communications devices (e.g., network interface cards or host-bus adapters for storage-array networks) CC1 and CC2. At the time represented in FIG. 1, processors PA1 and PA2, memory modules MB1 and MB2, and communications device C21 are active (A), while the remaining hardware resources are not active (N). Partition P21 includes processors PD1-PD4, memory modules ME1-ME4, and communications devices CF1 and CF2. Processors PD1-PD3, memory modules ME1-ME3, and communications device C21 are active.

Host resources 11 run a number of platform management programs including a request handler 13, a resource controller 15, a use rights calculator 17, and a license tracking and accounting program (license tracker) 18. License tracker 18 stores data regarding existing license rights. Included with license tracker 18 is a table 19 of weighting coefficients for different types of hardware resources, for example, type A processors (e.g., processors PA1-PA4) have a 1.0 weighting coefficient, while type D processors (e.g., processors PD1-PD4) have a weighting coefficient of 2.0. This means, for example, that the license rights consumed when a D-type processor is activated are double those consumed when an A-type processor is activated. In addition, license tracker 18 monitors hardware usage and charge usage according to licensing terms (which can include prepaid temporary license rights and pay-as-you-go terms).

Request handler 13 handles manual and automated requests for changing resource levels on a permanent or temporary basis. For example, a user can request that an additional processor be permanently activated for partition P11. Request handler 13 determines whether or not a processor is available for partition P11 and determines whether the necessary use rights were prepaid or, if not, whether they could be charged or purchased. Request handler 13 can communicate with a vendor system to purchase additional use rights as specified by a configuration file for request handler 13.

Request handler 13 calls use rights calculator 17 to determine whether available rights are sufficient for meeting a request to activate resources. Use rights calculator 17 uses the weighting coefficients table to make this determination. The calculator can determine from license tracker 18 the total amount of rights available and the total amount currently used and then determine whether the difference is sufficient to allow the resource request to be met. If the rights are not sufficient, the requestor is so notified. If the rights are sufficient, request handler commands resource controller 15 to activate resources as required. The change in activation is recognized by license tracker 18, which handles any necessary accounting changes.

A method ME1 executed by server system AP1 is flow charted in FIG. 1. Method segment M11 involves a resource allocation action such as an implementation of a change in resource allocation or a request for the same. Method segment M12 involves quantitatively evaluating license status as the weighted sum of actual or planned active resources. If method segment M11 involved implementation of a change in resource activations, then method segment M12 can involve detecting the new configuration and reflecting it in accounting at method segment M13. For example, prepaid rights can be debited, or a charge account can be charged. If method segment M11 involves only an unimplemented request, method segment M12 provides for determining whether the request can be met at method segment M14.

In the latter case, if the determination is that the request cannot be met, the requestor is notified of the insufficiency at method segment M15. Such a notice can allow the requestor to revoke the request or to take action (e.g., purchase additional use rights) to remedy the insufficiency. If the determination is that the request can be met, the new allocation can be implemented at method segment M16. Method ME1 can be iterated whenever resource requirements change.

Resource activations can be permanent or temporary. Temporary resource activations can be terminated at a predetermined time or under predetermined conditions, e.g., as specified in the request, or can be terminated by a separate request. A request to inactivate a temporarily activated resource can be implemented immediately at method segment M11, with the appropriate impact on accounting being recorded at method segment M13.

There are several useful scenarios for the invention. A user with prepaid rights can use them flexibly to purchase rights to different classes of devices (e.g., processors versus storage versus communications) and of different types (e.g., high performance versus low performance) within a class. The ability to pool rights across devices of the same class but different performance is particularly applicable for systems having components of different generations of technology.

The invention also has applicability to scenarios involving workload management, as it allows resources of one class or type to be exchanged for resources of another class or type.

For example, processing power can be migrated from one workload to another even thought the workloads run on respective stand alone systems of different generations. In this case, a global workload manager can take the weighting coefficients into account when assigning resources to workloads.

While migration of use rights among identical resources is straightforward, migration of use rights between resources with disparate capabilities can disrupt an intended correspondence between pricing and utility. The present invention applies use-rights weightings to hardware resources to provide for flexible migration of use rights while maintaining a relatively constant relationship between utility and pricing.

Figure 2:
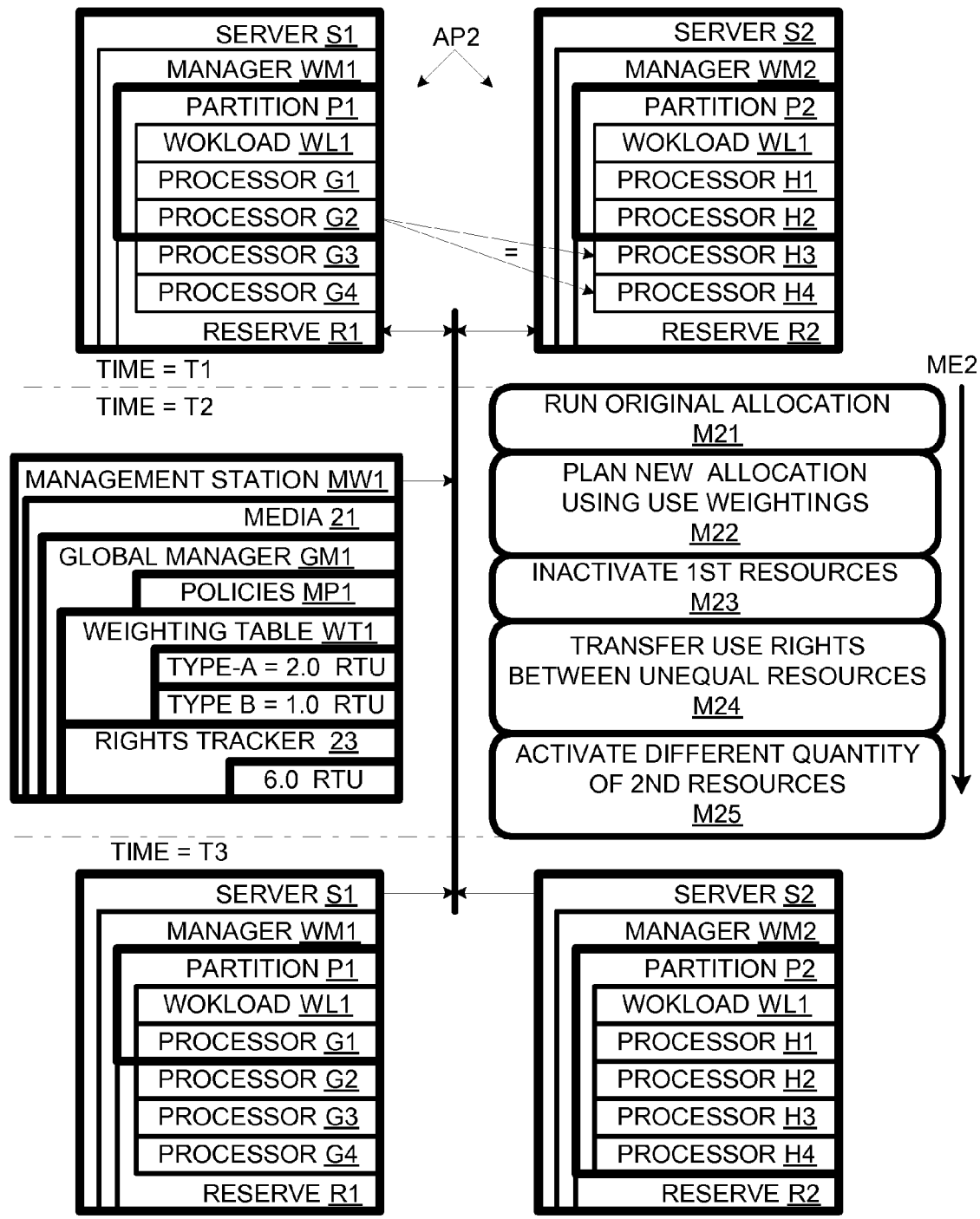
FIG. 2 is a combination schematic diagram and flow chart in accordance with other embodiments of the invention.

In the example of FIG. 2, a server system AP2 includes servers S1 and S2 and a management workstation MS1. Server S1 includes system-level hardware on which workload management software WM1 is run, partitions, e.g., partition P1, on which workloads (e.g., workload WL1) are run, and reserved hardware R1 which is inactive due to use-rights limits. In an alternative embodiment, workload management programs are run within the same partitions and using the same resources as the workloads being managed. At time T1, processors G1 and G2 are assigned to partition P1, while processors G3 and G4 are inactive and assigned to reserve R1. Similarly, server S2 includes system-level hardware on which workload management software WM2 is run, partitions for running workloads (e.g., workload WL2 on partition P2), and reserve hardware R2. At time T1, partition P2 includes processors H1 and H2, while processors H3 and H4 are in reserve R2.

While two standalone systems are shown in FIG. 1, the invention provides for any number of standalone systems. For example, the invention applies to a multi-partition monolithic system having two or more hard or virtual partitions or virtual machines. In addition, greater numbers of standalone systems of varying capacities can be used.

Management workstation MW1 runs software, stored on computer-readable storage media 21, for management system AP2 as a whole. In particular, global workload manager GM1 cooperates with server-specific workload managers WM1 and WM2 to track utilization, performance, and load, and reallocate hardware resources to workloads as a function of those parameters according to management policies MP1.

Global workload manager GM1 implements a reallocation plan through local workload managers WM1 and WM2, which are software agents. Workload managers contribute to reallocation planning by gathering and communicating utilization (e.g., percent of available processing power), performance (e.g., time to handle a request), and load data (e.g., quantity of requests received per second) to global workload manager GM1. In addition, workload managers WM1 and WM2 can trigger reallocation by communicating a request for additional resources (or an offer to relinquish resources) according to local management policies.

Global workload manager GM1 implements a method ME2. As shown in FIG. 2, system AP2 has an initial configuration at time T1 at method segment M21. At method segment MS2 and time T2, global manager GM1 initiates an allocation planning session. An allocation planning sessions can occur on a periodic basis, or be triggered in response to a request for additional resources or an offer to relinquish resources from either local workload manager WM1, WM2. Whenever a reallocation is to be determined, the total amount of use rights to be allocated must be determined as at method segment M22. In the present case, global workload manager GM1 refers to rights tracking software 23, which stores current licensing rights. In this case, rights tracker 23 indicates that 6.0 use rights are available. Note that different rights values may be available for different classes of resources, e.g., processors, memory, and communications devices. Also, the invention provides for increasing or decreasing use rights based management policies at method segment M22.

At method segment M22, the available hardware resources are weighted as set forth in weighting table WT1. Processors H1-H4 are rated at 1.0 use rights each, while processors G1-G4 are rated at 2.0 use rights each. In this case, processors G1-G4 are more advanced and more highly rated than processors H1-H4. Thus, one G-type processor can be exchanged for two H-type processors without affecting the total use rights available. For example, to shift processing power from partition P1 to partition P2, processor G2 can be activated and processors H3 and H4 can be added to partition P2. Once the resource equivalencies are established, resource allocation to workloads can be determined at method segment M23. The criteria are determined by the management policies. Once an allocation is determined it can be implemented at method segments M23-M25, resulting in the configuration shown for time T3 in FIG. 1.

Method segments M23-M25 can be ordered to avoid exceeding license rights at any instant. Where this is not a concern, method segments can be performed in other order. At method segment MS3, hardware resources that are planned for deactivation or deactivated so that use rights associated therewith are available for transfer.

Depending on the selection of weightings, it can be difficult to perform an "even-up" migration, e.g., one in which the amount of use rights released exactly matches the newly consumed use rights. For example, if resource J has a 1.0 weighting and resource K has a 1.1 weighting, then releasing 11 instances of resource permits 10 instances of resource K to be added with no "left-over" use rights. However, smaller migrations of resource J to resource K will leave some remainder. For example, releasing five instances of resource J will permit four instances of resource K to be added, with 0.6 use rights units left unutilized.

Depending on the business model, the unused rights might lead to a cost reduction, or might not. If there is no cost reduction, management policies may bias against allocations that use paid-for use rights inefficiently. On the other hand, the presence of unused use rights may make some reallocation more attractive than they otherwise might be. For example, if in the example with type J and type K use rights, if there were 0.1 unused use rights, then a release of only one type J resource would permit a full type K resource to be added.

The resources can be processors, storage (including memory and disk-based storage), and communications devices (including I/O devices and network interfaces). For each of the classes of resources, there can be subclasses, e.g., floating-point versus general-purpose processors, solid-state storage versus disk storage, and computer network bandwidth versus storage-array network bandwidth. Units can be in terms of clock rates, numbers of cores, storage capacity, and transfer rates.

The invention provides for different partitioning technologies including hard partitions, virtual partitions, and virtual machines. Some technologies allow finer allocations of hardware resources, e.g., fractional processors can be assigned to a workload. This capability can also be used to minimize unused use rights.

Herein, "software agents" are computer programs, and a computer "workload" is a program or set of programs. Herein, a "computer program" or more simply a "program" is an ordered set of instructions tangibly embodied in computer-readable storage media and interpretable and executable by a central processing unit. Herein, "program" does not encompass purely abstract ideas, natural phenomena, or laws of nature. A "program set" is a set of one or more programs. All programs described herein effect changes in state in computer-readable memory.

"Use rights", as the phrase is used herein, refers to a user's rights to use specific hardware and software resources. "Limited use rights" and "limited rights to use" and "right-to-use limitations" all refer to situations in which there is hardware and/or software installed within a computer system for which a user does not have use rights, but for which use rights may generally be obtained, either permanently or temporarily at some cost or under some conditions.

"Computer-readable media" refers to media that can be accessed by a computer and includes volatile and nonvolatile, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules or other data.

"Computer storage media" encompasses, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer.

"Communication media" encompasses computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of "computer-readable media".

In system AP1, hardware resource reallocations are determined in accordance with management policies MP1, which are user configurable. Management policies MP1 determine what factors are to be considered in allocating hardware resources and what ranges of allocations are possible. For example, management policies can require a minimum hardware configuration for a partition even under idle conditions, a maximum hardware configuration under full utilization, and various intermediate configurations. Management policies MP1 can require that the current use rights limitations be met by any reallocation. Alternatively, management policies can specify conditions under which use rights can be automatically increased (e.g., by an automated licensing arrangement) or decreased. These and other variations upon and modifications to the illustrated embodiment are provided by the present invention, the scope of which is defined by the following claims.

What is claimed is:

1. A computer system comprising:
hardware resources including processors, said hardware resources including active hardware resources with associated hardware use rights, said hardware resources including hardware resources without associated hardware use rights that are inactive, said active hardware resources being distributed among plural partitions including first and second partitions, each of said partitions providing for running a respective workload thereon; and
a license tracker for tracking assignments of hardware use rights to said hardware resources, said license tracker being adapted for assigning different weightings respectively to hardware resources of first and second types so as to equate the hardware use rights associated with said first quantity of a first type of said hardware resources with the hardware use rights associated with a different quantity of said second type of said hardware resources.

2. A computer system as recited in claim 1 wherein said license tracker is used to assign costs to temporary activations of hardware.

3. A computer system as recited in claim 2 wherein said active hardware resources include at least one of processors, communications devices, and storage devices.

4. A computer system as recited in claim 1 further comprising a workload manager configured to migrate certain hardware use rights from a first quantity of hardware resources previously assigned to said first partition to a second quantity of inactive hardware resources so that the latter can be activated and included in said second partition.

5. A computer system as recited in claim 4 wherein said workload manager reallocates resources to workloads without changing the amount of said hardware use rights.

6. A computer system as recited in claim 4 wherein said workload manager changes the quantity of said hardware use rights in the process of determining a new allocation of said hardware resources to workloads.

7. A computer system as recited in claim 4 wherein said first and second partitions are partitions within respective separate standalone servers.

8. A computer system as recited in claim 4 wherein said hardware use rights are assigned to at least one of processors, storage devices, and communications devices.

9. A computer system as recited in claim 8 wherein said hardware use rights are assigned to processors, the processors in said first partition having a common first performance rating, the processors in said second partition having a common second performance rating quantitatively different from said first performance rating.

10. A computer system as recited in claim 4 further comprising local managers for gathering at least one of utilization, performance, and load data for said partitions.

11. A computer system as recited in claim 10 wherein at least one of said local managers provides for communicating utilization, performance, and load data to said workload manager.

* * * * *